(12) United States Patent
Uesugi et al.

(10) Patent No.: US 9,522,852 B2
(45) Date of Patent: Dec. 20, 2016

(54) **USE OF BACTERIUM OF GENUS *BACILLUS* IN CIRCULAR AGRICULTURAL CYCLE**

(71) Applicant: ASAHI CALPIS WELLNESS CO., LTD., Shibuya-ku, Tokyo (JP)

(72) Inventors: Taisuke Uesugi, Kanagawa (JP); Haruko Kono, Tokyo (JP); Yu Takemura, Chiba (JP); Yuusuke Oomura, Kanagawa (JP)

(73) Assignee: Asahi Calpis Wellness Co., Ltd., Tokyo (JP)

( * ) Notice: Subject to any disclaimer, the term of this patent is extended or adjusted under 35 U.S.C. 154(b) by 23 days.

(21) Appl. No.: 14/564,392

(22) Filed: Dec. 9, 2014

(65) Prior Publication Data

US 2015/0158780 A1 Jun. 11, 2015

(51) Int. Cl.
*C05F 9/04* (2006.01)
*C05F 17/00* (2006.01)

(52) U.S. Cl.
CPC .......... *C05F 17/0027* (2013.01); *Y02P 20/145* (2015.11); *Y02W 30/43* (2015.05)

(58) Field of Classification Search
CPC ........................................................ C05F 9/04
See application file for complete search history.

(56) References Cited

U.S. PATENT DOCUMENTS

2006/0130545 A1 6/2006 Miyazaki et al.

FOREIGN PATENT DOCUMENTS

| EP | 1142988 A1 | 10/2001 |
|----|------------|---------|
| JP | 2002-293681 A | 10/2002 |
| JP | 3378858 B2 | 2/2003 |
| JP | 3406100 B2 | 5/2003 |
| JP | 3789303 B2 | 6/2006 |
| JP | 2007-210857 A | 8/2007 |
| JP | 2013-060378 A | 4/2013 |
| WO | WO 2004/067197 A1 | 8/2004 |

*Primary Examiner* — Rosanne Kosson
(74) *Attorney, Agent, or Firm* — Foley & Lardner LLP

(57) ABSTRACT

The present invention provides: a method for producing a compost, comprising composting plant-derived organic waste at a weight reduction rate of 95% or more by fermentation treatment, specifically by subjecting the organic waste to fermentation treatment comprising a primary fermentation, which comprises an intermittently agitated fermentation, and a secondary fermentation, which comprises an aerated fermentation, using a microorganism of *Bacillus subtilis* strain C-3102 (FERM BP-1096) or a mutant strain thereof; the compost produced by the above method; and a method for producing vegetables using the compost.

5 Claims, No Drawings

USE OF BACTERIUM OF GENUS *BACILLUS* IN CIRCULAR AGRICULTURAL CYCLE

CROSS-REFERENCE TO RELATED APPLICATIONS

This application claims priority from Japanese application no. JP 2013-256512, filed Dec. 11, 2013.

FIELD OF THE INVENTION

The present invention relates to a method for producing a compost using a particular bacterium of the genus *Bacillus*.

The present invention also relates to a method for producing vegetables using the compost.

BACKGROUND ART

Attention has been given in recent years to "circular agricultural cycle" in which cultivated agricultural crops again return as compost to agricultural lands, and various efforts are made everywhere. The reason why the "circular agricultural cycle" has received attention is that it is expected as an effective means of: improving fertilizer self-sufficiency by effective use of waste; or increasing soil fertility reduced due to the heavy use of chemical fertilizers by using compost.

In Japan, agriculture using chemical fertilizers providing necessary nutrition to soil has conventionally been carried out as a very efficient and effective method for increasing the yield of agricultural crops. Thus, salt damage by agricultural chemicals supplied in excess, problems with ammonium sulfate spread for supplying nitrogen, and the like have become pointed out in recent years.

The "circular agricultural cycle" as a substitute for the use of chemical fertilizers requires composting animal and plant waste with microorganisms. Known methods for such composting of waste include, for example, the following techniques.

Japanese Patent No. 3378858 describes a method for treating an organic waste being capable of converting organic waste to a useful organic fertilizer by using a carbonaceous base material, such as sawdust, straw, rice husks, twigs, bark, wood chips, bark, or duct, and activated mixed microorganisms having the action of fermenting and decomposing organic matter. As the microorganisms, mold, yeast, and the like are also described in addition to bacteria, such as *Bacillus subtilis* and *Bacillus stearothermophilus*.

Japanese Patent No. 3406100 describes a method for producing an organic fertilizer comprising adding an actinomycete of the genus *Streptomyces*, a bacterium of the genus *Pseudomonas* and/or a bacterium of the genus *Bacillus* to organic matter containing 20% by weight or more of arabinoxylan, and then fermenting the organic matter with such microorganism.

Japanese Patent Publication (Kokai) No. 2002-293681 A describes a method for producing a bark-like compost, comprising adding a nitrogen source, such as chicken dropping or urea, to the cortex of trees, such as broadleaf and needle leaf trees, and then adding thereto an aerobic ultra-thermophilic bacterium, such as an bacterium of the genus *Bacillus*, and then fermenting and maturating the cortex of trees with the aerobic ultra-thermophilic bacterium.

Japanese Patent No. 3789303 describes a method for fermentation treatment comprising adding *Bacillus subtilis* takemi strain to organic waste, a method using bacteria for reducing bitterness, and the like.

Japanese Patent Publication (Kokai) No. 2013-060378 A describes a method for composting organic waste or litter, comprising killing harmful microorganisms and, at the same time, composting the organic waste by mixing at least one microorganism selected from the group consisting of the genera *Bacillus*, *Geobacillus*, and *Aeribacillus* in the organic waste or litter.

Japanese Patent Publication (Sai-kohyo) No. 2004-067197 A describes a method for treating organic waste characterized by allowing a mesophilic bacterium having activity at 15-50° C. (*Bacillus subtilis*) and a thermophilic bacterium having activity at 50-70° C. (*Bacillus pallidus*) to exsit in the organic waste.

The following things are specifically disclosed as problems with techniques using chemical fertilizers.

The drawbacks of heavy usage, such as soil pollution and death of soil bacteria, have come to the surface due to use of chemical fertilizers having been useful for yield expansion (Japanese Patent Publication (Kokai) No. 2007-210857).

The heavy usage of agricultural chemicals/chemical fertilizers causes continuous cropping hazard for which the root hair is discolored to make phosphorus and minerals unabsorbable, and also results in the death of effective soil microorganisms and the inhibition of the food chain between effective microorganisms and plants (Japanese Patent No. 3789303).

Meanwhile, problems with the "circular agricultural cycle" include the problem of effort required and challenges such as the stabilization of the quality of compost. For example, unlike the composting of animal waste, such as livestock manure, and the like, techniques more specialized for plant waste utilization is required for plant waste and domestic garbage. Specifically, although cereal waste, such as wheat bran and defatted rice bran, has conventionally been known to be effective as a raw material for an organic fertilizer, it takes a long time (typically, about 40 days to 2 months) to compost because of being rich in cellulose and hemicellulose, which are less easily decomposed (Japanese Patent No. 3406100).

The solution of the above problems is needed to realize the circular agricultural cycle, and the supply of a good-quality and completely matured compost from organic waste as a biomass resource to agricultural producers will enable the production of good-quality agricultural products in high yield and will also realize the so-called circular agricultural cycle in which compost is produced from the waste and used for the production of agricultural products.

An object of the present invention is to provide a method for producing a good-quality compost from organic waste as a biomass resource for realizing the circular agricultural cycle, and the compost.

Another object of the present invention is to provide a method for producing taste-improved vegetables using the compost.

SUMMARY OF THE INVENTION

The present invention encompasses the following features.

(1) A method for producing a compost, comprising subjecting plant-derived organic waste to a fermentation treatment using a microorganism of *Bacillus subtilis* strain C-3102 (FERM BP-1096) or a mutant strain thereof, thereby composting the organic waste at a weight reduction rate of 95% or more.

(2) A method for producing a compost, comprising subjecting plant-derived organic waste to a fermentation treatment comprising a primary fermentation, which comprises an intermittently agitated fermentation, and a secondary fermentation, which comprises an aerated fermentation, using a microorganism of *Bacillus subtilis* strain C-3102 (FERM BP-1096) or a mutant strain thereof, thereby composting the organic waste at a weight reduction rate of 95% or more.

(3) The method according to (1) or (2) above, wherein the organic waste is vegetable waste.

(4) The method according to any one of (1) to (3) above, further comprising adding organic waste comprising cereal hull and/or cereal bran in the secondary fermentation.

(5) The method according to any one of (1) to (4) above, wherein the compost is a material for production of vegetables.

(6) A compost characterized by being used for production of vegetables and by being produced by the method according to any one of (1) to (5) above.

(7) The compost according to (6) above, wherein the vegetables are vegetables with an improved taste compared to a control compost produced from organic waste in the absence of the microorganism.

(8) A method for producing a vegetable, comprising cultivating a vegetable using a compost obtained by subjecting plant-derived organic waste to a fermentation treatment with a microorganism of *Bacillus subtilis* strain C-3102 (FERM BP-1096) or a mutant strain thereof to produce a vegetable with an improved taste compared to a control compost produced from the organic waste in the absence of the microorganism.

(9) A method for increasing the amount of vegetable production, comprising cultivating a vegetable using a compost obtained by subjecting plant-derived organic waste to a fermentation treatment with a microorganism of *Bacillus subtilis* strain C-3102 (FERM BP-1096) or a mutant strain thereof to thereby increase the amount of produced vegetable compared to a control compost produced from the organic waste in the absence of the microorganism.

(10) The method according to (8) or (9) above, wherein the compost is produced by a composting method comprising a primary fermentation, which comprises subjecting the organic waste to an intermittently agitated fermentation, and a secondary fermentation, which comprises an aerated fermentation using the microorganism.

(11) The method according to (10) above, further comprising adding organic waste comprising cereal hull and/or cereal bran in the secondary fermentation.

(12) The method according to any one of (8) to (11) above, wherein the organic waste is vegetable waste.

(13) The method according to (8) above, wherein the vegetable with an improved taste is a vegetable with improved bitterness, astringency and/or saltiness.

(14) The method according to any one of (8) to (13) above, wherein the vegetable is a root vegetable.

(15) The method according to (8), (13), or (14) above, wherein the vegetable with an improved taste is carrot.

(16) The method according to (9) or (14) above, wherein the vegetable is Japanese white radish or carrot.

DETAILED DESCRIPTION OF THE INVENTION

Mode For Carrying Out The Invention

The present invention will be described in further detail.
1. Method for Producing Compost According to a first aspect, the present invention provides a method for producing a compost, comprising subjecting plant-derived organic waste to a fermentation treatment using a microorganism of *Bacillus subtilis* strain C-3102 (FERM BP-1096) or a mutant strain thereof, thereby composting the organic waste at a weight reduction rate of 95% or more.

According to a second aspect, the present invention provides a method for producing a compost, comprising subjecting plant-derived organic waste to a fermentation treatment comprising a primary fermentation, which comprises an intermittently agitated fermentation, and a secondary fermentation, which comprises an aerated fermentation, using a microorganism of *Bacillus subtilis* strain C-3102 (FERM BP-1096) or a mutant strain thereof, thereby composting the organic waste at a weight reduction rate of 95% or more.

The microorganism used for the production of a compost is *Bacillus subtilis* strain C-3102 (FERM BP-1096) or a mutant strain thereof. As such a microorganism, for example, "Serverix®"•BS provided by the present applicant is a microbial material containing *Bacillus subtilis* strain C-3102 at $5\times10^9$ cfu/g and can be used for the methods of the present invention.

*Bacillus subtilis* strain C-3102 was originally deposited on Dec. 25, 1985 with the designation of microorganism "*Bacillus subtilis* strain c-3102" under Deposit No. 8584 at the IPOD, National Institute of Advanced Industrial Science and Technology (the old name when deposited: the Fermentation Research Institute Agency of Industrial Science and Technology, Ministry of International Trade and Industry) located at 1-1-1 Higashi, Tsukuba, Ibaraki, Japan (the old address when deposited: 1-1-3 Higashi, Yatabe, Tsukuba, Ibaraki, Japan) and has been transferred to the international deposit on Jun. 28, 1986 at the same depositary under Accession No. FERM BP-1096 (the old deposit number when transferred: Deposit No. 1096), and the deposited microorganism is currently stored at the IPOD of Technology and Evaluation (NITE) (located at room 120, 2-5-8 Kazusakamatari, Kisarazu-shi, Chiba, Japan). The bacteriological properties of *Bacillus subtilis* strain C-3102 (FERM BP-1096) are described in Japanese Patent Publication (Kokai) No. 63-209580 A and No. 62-232343 A.

The medium usable in the culture of *Bacillus subtilis* strain C-3102 is a liquid medium or a solid medium containing carbon sources, nitrogen sources, inorganic materials, and the like, usually used for the culture of a microorganism of the genus *Bacillus*. The carbon sources may be assimilable carbon sources, including, for example, glucose, sucrose, starch, and molasses. Examples of the nitrogen sources can include peptone, meat extract, yeast extract, caseinate hydrolysate, and ammonium sulfate. In addition, salts of phosphoric acid, magnesium, sodium, potassium, calcium, iron, manganese, and the like, vitamins, amino acids, an antifoaming agent, a surfactant, and the like can be added, if necessary. The culture is preferably carried out under aerobic conditions; and preferably, the initial pH of the medium is 5 to 9, particularly 6 to 8, the culture temperature is 20-50° C., particularly 35-40° C., and the culture time is 12 hours to 7 days. The strain C-3102 is resistant to a high temperature of about 70° C. because of being capable of forming a spore.

The microorganism usable in the present invention may be a mutant strain of *Bacillus subtilis* strain C-3102. Such a mutant strain can be obtained by a method, such as a method of culturing the parent strain in the presence of a chemical mutagen (e.g., nitrosoguanidine, nitrosourea, methyl ethane-sulfonate, or a derivative thereof), or a method of irradiating the cultured parent strain with high-energy beams (e.g., ultraviolet rays, gamma rays, X rays, or heavy ion beams). A candidate mutant strain is added to plant-derived organic waste, and the mutant strain usable in the present invention can be selected using as an indicator that the candidate mutant strain can be present in an amount of $1\times10^6$ cfu/g or more during the period from the start of fermentation to the end of fermentation in the primary fermentation and has an ability to raise a fermentation temperature to about 50-70° C. in the secondary fermentation.

The microbial concentration used in the method of the present invention can include, but is not limited to, a concentration from $1\times10^3$ cfu/g to $1\times10^9$ cfu/g or higher as the initial concentration in the primary fermentation.

The plant-derived organic waste is plant waste, such as vegetable waste, waterweed, weed, cereal hull, or cereal bran. The organic waste as a preferable main material is vegetable waste, such as vegetable scraps discharged from food companies, supermarkets, and the like and vegetables discarded from farmhouses. In addition to the vegetable waste, the cereal hull and/or cereal bran may be used as a subsidiary material. Examples of the cereal include rice, wheat, and barley; rice hull, bran, and the like, that can be used as the subsidiary material. The bran includes rice bran, wheat bran, and oat bran. The vegetable waste contains about 80% of moisture. The subsidiary material can be added at the stage of fermentation. For example, the subsidiary material may or may not be added to the main material at the stage of the primary fermentation, but is preferably added at the stage of the secondary fermentation in order to further promote fermentation. The weight ratio of the subsidiary material to a primarily fermented product is, for example, about 1/20 to 1/80, but is not limited to such range.

The fermentation treatment in the method of the present invention consists specifically of a primary fermentation and a secondary fermentation.

The primary fermentation is a step of intermittently agitated fermentation intended to mainly reduce the weight of the plant-derived organic waste and can achieve a weight reduction rate of 90 to 95%. The above-mentioned microorganism can be added in an amount of, for example, $1\times10^3$ cfu/g to $1\times10^9$ cfu/g, preferably $1\times10^5$ cfu/g to $1\times10^7$ cfu/g, per g of vegetable waste (moisture content: about 80%) obtained by chipping vegetable scraps discarded from food processing plants, but the addition amount is not limited to such range. During the primary fermentation, the fermentation temperature is increased by about 5° C. or higher compared to the case that no microorganism is added, and reaches, for example, about 40° C. or higher. Because of this, the weight reduction rate of the organic waste is presumed to be increased.

The secondary fermentation is a step of adding a subsidiary material containing bran and performing fermentation under aeration. The fermentation temperature is further increased and reaches 50° C. or higher, up to about 60-70° C. or higher. The fermentation temperature is increased by about 10° C. compared to the case of the non-addition of a microorganism, and the period of time holding at 40-60° C. after reaching the maximum temperature is prolonged by about 10 days. Thus, the weight reduction rate of the organic waste finally reaches 95% or more, for example, 97-98%.

The primary fermentation step takes about 1 month and the secondary fermentation step takes about 3 months; however, the period of time needed for each step can be shortened by increasing an aeration volume, increasing a microbial content, or enhancing a stirring efficiency, for example.

A composting apparatus comprises an input port(s) for charging organic waste and a microorganism, an agitator(s) or stirrer(s), a temperature sensor(s), and a drainpipe(s), and may further comprise a shredder for chipping the waste, a temperature monitor, and the like. The volume capacity of the composting apparatus is suitably 50 L to 1,500 L and may exceed this range. The composting may be carried out by a batch process or by a continuous process; however, the continuous process has an advantage that the volume capacity of the apparatus may be small. In the continuous process, for example, when the apparatus having a volume capacity of 500 L is used, 200-300 kg/day of organic waste and $1\times10^5$ cfu/g to $1\times10^7$ cfu/g or more of a microorganism per g of the waste can be added to perform the primary fermentation while carrying out intermittent agitation or stirring until the treatment of a predetermined amount of the organic waste is completed, followed by performing the secondary fermentation while carrying out aeration.

Completely matured compost is recovered once the weight reduction rate of the organic waste reaches 95% or more, preferably 97% or more.

According to the method of the present invention, for example, about 160 kg of a compost can be produced from 5,450 kg (moisture content: about 80%) of vegetable scraps (weight reduction rate: 97%).

The compost produced by the above method can be used for production of vegetables, production of flowers and ornamental plants, kitchen garden, and the like. It can be preferably used for the production of vegetables.

The present invention also provides a compost with good quality produced by the above-mentioned method.

The compost of the present invention can provide an advantage that it significantly increases a yield of vegetables compared to the case of the cultivation with chemical fertilizers or the cultivation with a compost produced without addition of microorganism (herein referred to as "control") and improves the taste of the vegetables. As used herein, the "improves the taste" means that for example, as a result of taste analyses conducted using a taste sensor, bitterness, astringency and/or saltiness are improved and, that is, they are significantly reduced compared to the control. Such advantage has now been confirmed in vegetables, particularly root vegetables, by the present inventors. Root vegetables include, for example, carrot. The compost of the present invention is characterized by being used for production of vegetables.

2. Method for Producing Vegetable

The present invention further provides a method for producing a vegetable, comprising cultivating a vegetable using a compost obtained by subjecting plant-derived organic waste to fermentation treatment with a microorganism of *Bacillus subtilis* strain C-3102 (FERM BP-1096) or a mutant strain thereof, and then producing a vegetable with an improved taste compared to control.

As described above, the compost is a compost prepared by a composting method comprising a primary fermentation involving subjecting organic waste, such as vegetable waste, to intermittently agitated fermentation and a secondary fermentation involving aerated fermentation, using the microorganism.

The vegetable includes, but is not particularly limited to, any of root vegetables, leaf vegetables, fruit vegetables, and the like.

Examples of the fruit vegetables include cucumber, eggplant, pimento, gumbo, melon, and horsebean.

Examples of the leaf vegetables include Japanese mustard spinach, Chinese cabbage, brussels sprouts, shallot, udo, and bamboo shoot.

Examples of the root vegetables include Japanese white radish, carrot, turnip, yam, burdock, shallot, and golden-banded lily.

The vegetable is preferably a vegetable whose taste such as bitterness, astringency and/or saltiness is a problem.

The present inventors have now confirmed that the cultivation of a root vegetable using the compost reduces bitterness, astringency and/or saltiness in the produced root vegetable (particularly, carrot) and thereby can increase the added value of the vegetable. The use of the compost of the present invention in the cultivation of a vegetable can increase the yield of the vegetable.

Specifically, when Japanese white radish (94 seeds) and carrot (420 seeds) were cultivated using 56 kg of the compost produced by the above method according to the method of the present invention, they could be obtained in amounts of about 67 kg and about 30 kg, respectively. In cultivation with control, they were obtained in amounts of about 61 kg and about 25 kg, respectively, for the compost produced without addition of microorganism and about 57 kg and about 22 kg, respectively, for a chemical fertilizer. Thus, the method of the present invention enables the productivity of a vegetable to be improved.

EXAMPLES

The present invention will be more specifically described below with reference to Examples. However, the Examples shall not limit the technical scope of the present invention.

Example 1

<Composting Vegetable Scraps>

Vegetable scraps (200 kg) discharged from a vegetable processing plant and rice husk were charged into a composting apparatus, "Apparatus for Fermentation Decomposition of Food Remnant Fourstars MDT-500" (from Merry's Japan Co., Ltd.), and a test was started after providing 2 test areas consisting of an addition area in which was added 1 kg of "Serverix®"·BS containing *Bacillus subtilis* strain C-3102 (FERM BP-1096) as the main component (Calpis Co., Ltd.) and a non-addition area in which the microorganism is not added. Thereafter, the charge of the vegetable scraps was continued for 22 days and 200-300 kg/day thereof was charged. In this regard, "Serverix®"·BS was mixed in the addition area so that *Bacillus subtilis* strain C-3102 (FERM BP-1096) has a bacterial number of $1 \times 10^6$ cfu or more per gram of vegetable scraps.

Then, the whole amount of the content was collected from the composting apparatus on day 23 after the start of the test and was then transferred to a flexible container bag, followed by adding rice husk and rice bran and subsequently inserting a high-pressure aerator, "Easy Jet Jr" (Miraie Corporation), into the bag in order to start post-fermentation. The post-fermentation was continued for 80 days to provide a compost of vegetable scraps. The weight reduction rate in composting vegetable scraps is shown in Table 1. In the table, the weight reduction rate=(1−the amount of compost from vegetable scraps/charged vegetable scraps)×100%.

TABLE 1

| | Weight reduction rate (%) |
| --- | --- |
| Addition area | 97.0 |
| Non-addition area | 94.8 |

The results of Table 1 show that the weight reduction rate was noticeably enhanced in the addition area compared to that in the non-addition area.

<Fertilizing a Compost Produced from Vegetable Scraps>

In a field were provided 3 test areas: an addition compost area in which 56 kg of the compost produced from vegetable scraps in the addition area was fertilized, a non-addition compost area in which 56 kg of the compost produced from vegetable scraps in the non-addition area was fertilized, and a chemical fertilizer area in which available nitrogen, effective phosphoric acid ($P_2O_5$), and exchangeable potassium ($K_2O$) were added as chemical fertilizers in amounts equivalent to those in 56 kg of the compost produced in the addition area. The above chemical fertilizers used in the chemical fertilizer area were ammonium sulfate, calcium superphosphate, and potassium sulfate, respectively.

<Cultivating Japanese White Radish and Carrot>

Seeds of Japanese white radish and carrot were sown at equally spaced intervals in the 3 test areas set in the field. The number of the sown seeds is shown in Table 2. Whole amounts of the produced Japanese white radish and carrot were harvested at 96 and 123 days, respectively, after sowing. The yield of Japanese white radish and carrot is shown in Table 3.

TABLE 2

| | Number of Japanese white radish seeds sown (seeds) | Number of carrot seeds sown (seeds) |
| --- | --- | --- |
| Addition compost area | 94 | 420 |
| Non-addition compost area | 94 | 415 |
| Chemical fertilizer area | 96 | 410 |

TABLE 3

| | Total weight of harvested Japanese white radish (kg) | Total weight of harvested carrot (kg) |
| --- | --- | --- |
| Addition compost area | 67.4 | 29.6 |
| Non-addition compost area | 61.2 | 24.6 |
| Chemical fertilizer area | 57.3 | 21.6 |

The results of Table 3 show that both the Japanese white radish and the carrot showed the highest yields in the addition compost area.

<Taste Analysis of Produced Carrot>

The harvested carrot (edible portion) was mashed and then filtered with a bleached cloth, and the resultant carrot juice was analyzed using a taste sensor, "Taste Recognition Apparatus TS-5000Z" (Intelligent Sensor Technology, Inc.). The results are shown in Table 4.

TABLE 4

| | Bitterness/ off-flavor | Astringent stimulus | Saltiness |
|---|---|---|---|
| Addition compost area | 0.9 | 0.8 | 1.0 |
| Non-addition compost area | 1.5 | 1.2 | 1.9 |
| Chemical fertilizer area | 1.9 | 1.4 | 3.6 |

From the results of Table 4, it was confirmed that the juice of carrot in the addition compost area was lowest in bitterness, astringency, and saltiness.

INDUSTRIAL APPLICABILITY

The compost produced by the method of the present invention is a material produced from vegetable waste or scraps, and using the compost for production of vegetables can achieve increased yields of vegetables as well as improvement in the taste of the vegetables. Thus, the present invention is useful in agriculture and particularly provides the advantage of enabling the circular agricultural cycle.

The invention claimed is:

1. A method for producing a compost, comprising subjecting plant-derived organic waste to a fermentation treatment using a microorganism of *Bacillus subtilis* strain C-3102 (FERM BP-1096), thereby composting the organic waste at a weight reduction rate of 95% or more.

2. A method for producing a compost, comprising subjecting plant-derived organic waste to a fermentation treatment comprising a primary fermentation, which comprises an intermittently agitated fermentation, and a secondary fermentation, which comprises an aerated fermentation, using a microorganism of *Bacillus subtilis* strain C-3102 (FERM BP-1096), thereby composting the organic waste at a weight reduction rate of 95% or more.

3. The method according to claim 1, wherein the organic waste is vegetable waste.

4. The method according to claim 2, further comprising adding organic waste comprising cereal hull and/or cereal bran in the secondary fermentation.

5. The method according to claim 1, wherein the compost is a material for production of vegetables.

* * * * *

UNITED STATES PATENT AND TRADEMARK OFFICE
CERTIFICATE OF CORRECTION

PATENT NO. : 9,522,852 B2  
APPLICATION NO. : 14/564392  
DATED : December 20, 2016  
INVENTOR(S) : Taisuke Uesugi et al.

Page 1 of 1

It is certified that error appears in the above-identified patent and that said Letters Patent is hereby corrected as shown below:

On the Title Page

Insert the following foreign priority information:
--(30)   Foreign Application Priority Data  
Dec. 11, 2013   JP ......................... 2013-256512--

Signed and Sealed this  
Twenty-first Day of March, 2017

Michelle K. Lee  
*Director of the United States Patent and Trademark Office*